US006853958B1

(12) United States Patent
Turin et al.

(10) Patent No.: US 6,853,958 B1
(45) Date of Patent: Feb. 8, 2005

(54) SYSTEM AND METHOD FOR COLLECTING AND DISSEMINATING HOUSEHOLD INFORMATION AND FOR COORDINATING REPAIR AND MAINTENANCE SERVICES

(75) Inventors: Jody L. Turin, Sylvania, OH (US); Stanley Joseph Rusek, Jr., Granville, OH (US); George A. Bowne, Columbus, OH (US); Jocelyn M. Seng, Granille, OH (US)

(73) Assignee: Integrex, Granville, OH (US)

( * ) Notice: Subject to any disclaimer, the term of this patent is extended or adjusted under 35 U.S.C. 154(b) by 424 days.

(21) Appl. No.: 09/607,273

(22) Filed: Jun. 30, 2000

(51) Int. Cl.[7] .................................................. H04N 7/18
(52) U.S. Cl. ....................... 702/188; 702/182; 702/183; 702/184; 702/185; 702/187
(58) Field of Search ............................... 702/60–62, 24, 702/30–32, 99, 108, 113, 114, 118, 122, 130, 132, 182–185, 187, 188, FOR 103–FOR 104, FOR 106, FOR 111, FOR 112, FOR 119, FOR 116, FOR 125, FOR 124, FOR 134–FOR 135; 340/870.01, 870.02, 870.13, 500, 516, 825.69, 825.72, 572.1; 700/286, 291, 295, 277, 278

(56) References Cited

U.S. PATENT DOCUMENTS

| 4,502,044 | A | | 2/1985 | Farris et al. |
| 4,598,273 | A | | 7/1986 | Bryan, Jr. et al. |
| 4,737,847 | A | * | 4/1988 | Araki et al. ................ 348/161 |
| 4,858,141 | A | | 8/1989 | Hart et al. |
| 5,144,661 | A | * | 9/1992 | Shamosh et al. ........... 348/143 |
| 5,467,922 | A | * | 11/1995 | Carey et al. .................. 236/94 |
| 5,568,121 | A | * | 10/1996 | Lamensdorf ................ 340/539 |
| 5,648,724 | A | | 7/1997 | Yankielun et al. |
| 5,717,379 | A | * | 2/1998 | Peters ........................ 340/539 |
| 6,108,034 | A | * | 8/2000 | Kim ............................ 348/154 |
| 6,122,678 | A | * | 9/2000 | Eckel et al. .................. 710/15 |
| 6,134,303 | A | * | 10/2000 | Chen ........................... 379/49 |
| 6,281,790 | B1 | * | 8/2001 | Kimmel et al. ............. 340/506 |
| 6,400,265 | B1 | * | 6/2002 | Saylor et al. ............... 340/531 |
| 6,453,687 | B2 | * | 9/2002 | Sharood et al. .............. 62/127 |
| 6,529,230 | B1 | * | 3/2003 | Chong ..................... 348/14.01 |
| 6,542,076 | B1 | * | 4/2003 | Joao ........................... 340/539 |
| 2001/0034586 | A1 | * | 10/2001 | Ewert et al. ................ 702/188 |
| 2002/0057340 | A1 | * | 5/2002 | Fernandez et al. .......... 348/143 |
| 2003/0001754 | A1 | * | 1/2003 | Johnson et al. ........ 340/870.02 |

OTHER PUBLICATIONS

Massachusetts Institute of Technology Office of Sponsored Programs; House_n: The MIT Home of the Future.
Hart, Sara, The Massachusetts Institute of Technology begins House_n, an ambitious three–year project to reinvent the most important building type (http://architecture.mit.edu/house_n/web/press/Technlology%20–%Home%20Work.htm).

(List continued on next page.)

Primary Examiner—Marc S. Hoff
Assistant Examiner—Carol Tsai
(74) Attorney, Agent, or Firm—Inger H. Eckert; James J. Dottavio

(57) ABSTRACT

A method and system for collecting and disseminating household information is disclosed. The predictive system diagnoses deterioration and problems in a house and provides an early alert or notification of potential problems. The system integrates the local and remote monitoring of a house with the dispatching and coordinating of repairs. The system also generates and provides access to data that homeowner otherwise would not have access to or be able to generate.

9 Claims, 5 Drawing Sheets

OTHER PUBLICATIONS

Larson, Kent, Massachusetts Institute of Technology and Industrial Sponsors Investigate the Home of the Future (http://architecture.mit.edu/house_n/web/publications/press-release-10-99.htm).

House_n Research (http://architecture.mit.edu/house_n/publications.htm).

House_n Press (http://architecture.mit.edu/house_n/web/press/press.htm).

Consol, Mike, "The Home of the Future" (http://architecture.mit.edu/house_n/web/...20Business%20Journal%20of%20Portland.htm).

"Engineers Ready to Build MIT's 'Home of the Future'" (http://architecture.mit.edu/house_n/web/press/Article%20Future%20Homes.htm).

"Towards and Integrated Adaptable, Machine-Crafted Methodology for Making Places to Live" (http://architecture.mit.edu/-k11/4 195 Spring2000.html).

House_n Courses and Events (http://architecture.mit.edu/house_n/web/events/events.htm).

House_n Case Studies (http://architecture.mit.edu/house_n/web/case-studies/studies.htm).

House_n Research (http://architecture.mit.edu/house_n/web/research/research.htm).

Fonda, Darren, A House Called HAL, (http://architecture.mit.edu/house_n/web/...com%20Boston%20Globe%20Magazine.htm).

"Owens Corning Forecasts Homes with Sixth Sense in Future: Development of Sensor Technology for Home Exteriors and Interiors Underway" (http://ca.biz.yahoo.com/prnews/000114/oh_owens_c_2.html).

"House_n: The MIT Home of the Future".

"Manage—Satisfaction Gauranteed" (Perfect Service Builders, Inc.).

Several articles regarding home warranty concepts.

McCullough, Stacie, "Dynamic Supply Chains Alter Traditional Models".

Goering, Richard, "SiliconX puts IC supply chain on-line".

Deplanque, Alexis, "Moving up and down the supply chain".

Kahl, Steven J., "What's the 'Value' of Supply Chain Software?".

Cooke, Aaron, "The Dawn of Supply Chain Communities".

PlasticsNet.com (Business Review).

Plastics—e-volved solutions for the plastics industry.

PurchasePro.com—Specializing in Business to Business Procurement and E-Commerce.

MetalSite—Global Metals Marketplace.

MetalSite Auction Seller Features.

* cited by examiner

SYSTEM AND METHOD FOR COLLECTING AND DISSEMINATING HOUSEHOLD INFORMATION AND FOR COORDINATING REPAIR AND MAINTENANCE SERVICES

BACKGROUND OF THE INVENTION

1. Field of the Invention

The present invention relates generally to the home maintenance process, and more particularly to a system and method for collecting and disseminating information relating to maintenance issues in a house.

2. Related Art

Homeowners take pride in the appearance of their house. Regardless of the size or type of house, they want their home to be safe and secure. Weather elements and daily life activity wear on the house. Repair and maintenance of the house is required to ensure the safety and security of the occupants.

Appliances in a house have a limited operational life and deteriorate due to repeated use. Appliances sometimes fail after extensive use for problems that if otherwise remedied, the failure could have been prevented. Unfortunately, the homeowner is usually unaware of these problems. The repair and maintenance of appliances and other equipment associated with a house is encompassed in the concept of the repair and maintenance of a house.

Many times, the potential for safety and security problems is related to the size of the house. Since the average size of a house is increasing, there are more structures and elements that require attention today than ever before.

Home repair and maintenance projects require three elements: money, knowledge, and time. The money element focuses on whether the homeowner has sufficient money to pay for the repairs. The knowledge element requires the homeowner's knowledge of a potential problem and how to repair or fix the problem. The time element has two components. First, whether the homeowner has the time to make the repairs. Second, whether the homeowner has the time to monitor the house and identify the problems that need to be repaired.

The money element usually is not the critical issue in the decision whether to make a repair to a house. Homeowners are increasingly spending more money on the repair and maintenance of their homes. Dual income households are more common today. Also, more people are able to afford to buy a house now for many reasons, including lower interest rates.

The knowledge element is an important issue in the repair and maintenance process. Some problems may be identified through visual inspection or stand-alone detectors. However, homeowners are unable to detect or predict potential problems in their home until too late.

Regarding the knowledge of how to repair problems, there ate numerous sources of reference information available today. For example, many homeowners purchase do-it-yourself books. Also, the number of households with a personal computer and are connected to the Internet has increased. Do-it-yourself solutions are also available on the Internet.

Since people are busier today than in the past, the time element is the most critical issue. People need to have time in their daily and weekly routine for relaxation. An effect of having two incomes in a household is a reduction in leisure time. Children and other activities also require time. In addition, since the average number of occupants in a house is decreasing, fewer people are available to assist with the repair and maintenance of the house.

Homes and appliances include more electronic and sophisticated devices that are not serviceable by the typical homeowner. Furthermore, the typical homeowner lacks the experience, skills, and tools to repair or maintain most items in a home.

As a result, homeowners have less time to devote to the repair and maintenance of their homes. The consequences are that homeowners are unable to detect effectively problems early in their home and unable or unwilling to repair the problems.

Another component of the repair and maintenance process is whether the house or appliance problem is covered under a warranty. Few homeowners track the warranty coverage for their house or for appliances or other equipment in their house. The quantity of information to process and retain during the course of daily life is overwhelming. Keeping track of the period of a warranty and the types of problems that are covered is not a priority. In addition, many homeowners inadvertently throw out warranty information well before the information is needed. Therefore, if a problem arises, it is difficult to determine whether the problem is covered by a warranty.

It is therefore desirable that an improved method and system for collecting and disseminating household information be provided that overcomes limitations of conventional repair and maintenance identification methods. It is also desirable that an improved method and system for coordinating repair and maintenance services and monitoring warranties be provided.

SUMMARY OF THE INVENTION

A method and system for collecting and disseminating household information is provided by the present invention. The present invention provides a predictive system for diagnosing deterioration and problems in a house. The predictive system provides an early alert or notification of potential problems. Early identification and troubleshooting of problems prevents expensive and untimely appliance and system failures. The troubleshooting also enhances the efficiency and accuracy of the repair process, thereby reducing costs.

The system integrates the local and remote monitoring of a house with the dispatching and coordinating of repairs. The system also generates and provides access to data that a homeowner otherwise would not have access to or be able to generate. Benefits of the system include energy savings and conservation.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE INVENTION

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

In the present invention, the home improvement process has been redefined. With the features of the present invention, homeowners easily and efficiently access information about their home, thereby facilitating the repair and maintenance process of their home. To illustrate the features of the present invention, the life cycle of a house is described. Then the repair and maintenance process and system is described in four parts: (1) monitoring and collecting of household data; (2) processing the collected data; (3) disseminating information from central unit, and (4) coordinating services. Finally, the operation of the repair and maintenance process is described.

Life Cycle of a House

Figure 1:
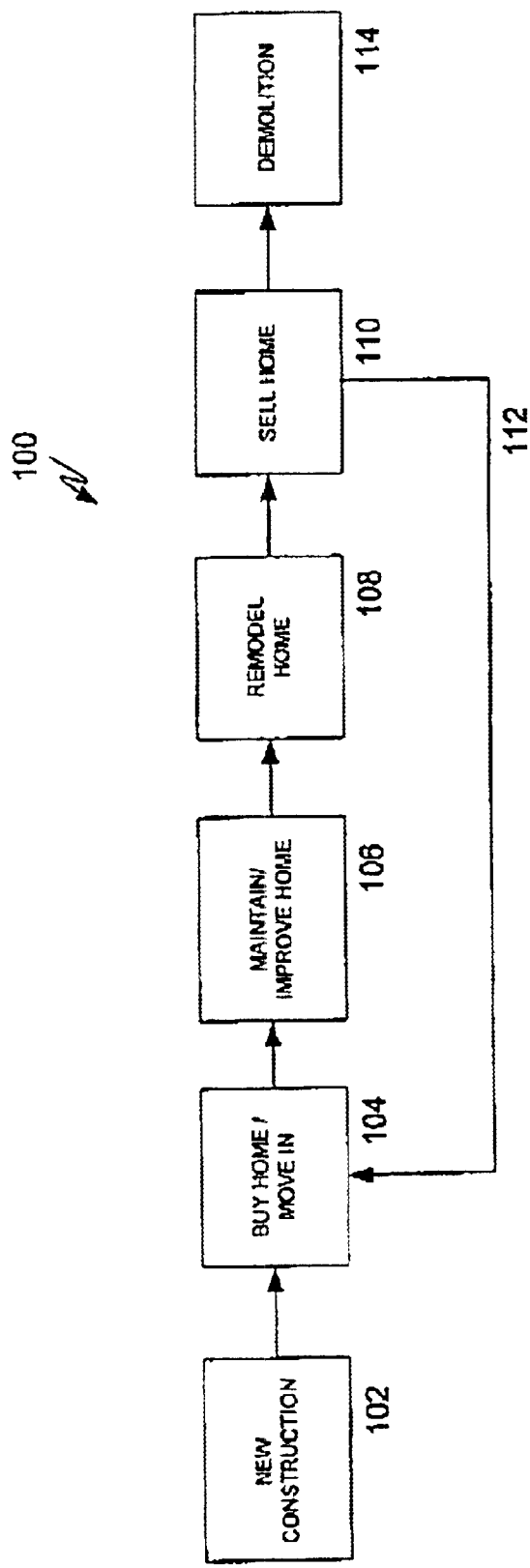
FIG. 1 depicts a block diagram illustrating a life cycle of a house.

An example: of a life cycle of a house is illustrated in the block diagram 100 depicted in FIG. 1. Block diagram 100 begins with the construction of a house in step 102. The first step that many homeowners are involved with is the transaction of purchasing the house in step 104. Step 104 presents the first potential opportunity or need for any repair or maintenance to the house.

Typically, prior to the closing of purchase of the house, the buyer obtains an inspection of the house by a professional home inspector. The home inspector examines the structure of the house and identifies any defects or problems that should be addressed and remedied by the seller prior to the closing. The home inspector usually examines the interior and exterior of the house as well as any appliances that the seller is conveying with the house. The inspector usually generates a written report that summarizes the findings of the inspection.

Sellers sometimes leave major appliances that convey with the house upon the sale, including appliances such as a water heater, clothes washer and dryer, refrigerator, dishwasher, etc. Unfortunately, buyers are not informed or aware of the warranties or prior maintenance performed on these appliances by the seller. For protection against unknown conditions of the house or major appliances, buyers typically opt for a home warranty that provides coverage for these items.

In addition to the inspection of the house, an inspector may offer some tips for home performance optimization. During an inspection, the inspector may identify changes that may be made to the house to potentially optimize the operation of the house. For example, the inspector may recommend adding insulation on piping or ductwork.

Unfortunately, most homeowners contemplate obtaining a home inspection only in conjunction with the purchase of the house. Once the homeowner moves into the house, the homeowner relies on his or her own ability to determine when repairs or maintenance need to be made, which often occurs after a catastrophic failure.

In step 106, the need to maintain and repair the house is continuous and usually increases exponentially over time. For example, a small leak or water or moisture problem that is not remedied may eventually become a more serious problem.

Home maintenance involves the continuous monitoring of the house. The structure of the house and the appliances outside and inside of the house should be monitored regularly to predict and detect potential problems before they deteriorate into more severe problems. Early detection of problems with structural elements of a house or appliances might prevent some expensive failures. For example, water or moisture contamination on wooden structures in the house may be a preliminary sign of rotting wood, which could eventually collapse if not treated.

Continuous monitoring increases the homeowner's knowledge of potential problems throughout and the need for repairs. With more information, the homeowner is better educated to make informed decisions on when and how to implement such repairs on a timely basis.

In step 108, substantial improvements to a house are considered to be a renovation or a remodeling of the house. A renovation of a house is typically done for reasons other than regular repair or maintenance. For example, a homeowner may remodel a house to improve its appearance, increase the living space, or add features to the house. Renovations and remodeling projects are typically performed infrequently.

In step 110, when the homeowner wants to move, he or she sells the house. In this transaction, the current homeowner is now the seller as described in step 104. The life of the house returns to step 104 as shown by arrow 112 and steps 104, 106, 108, and 110 are repeated. Of course, if no one purchases the house or the homeowner wants to replace it, the house may be demolished in step 114.

Monitoring and Collecting Data From House

Figure 2:
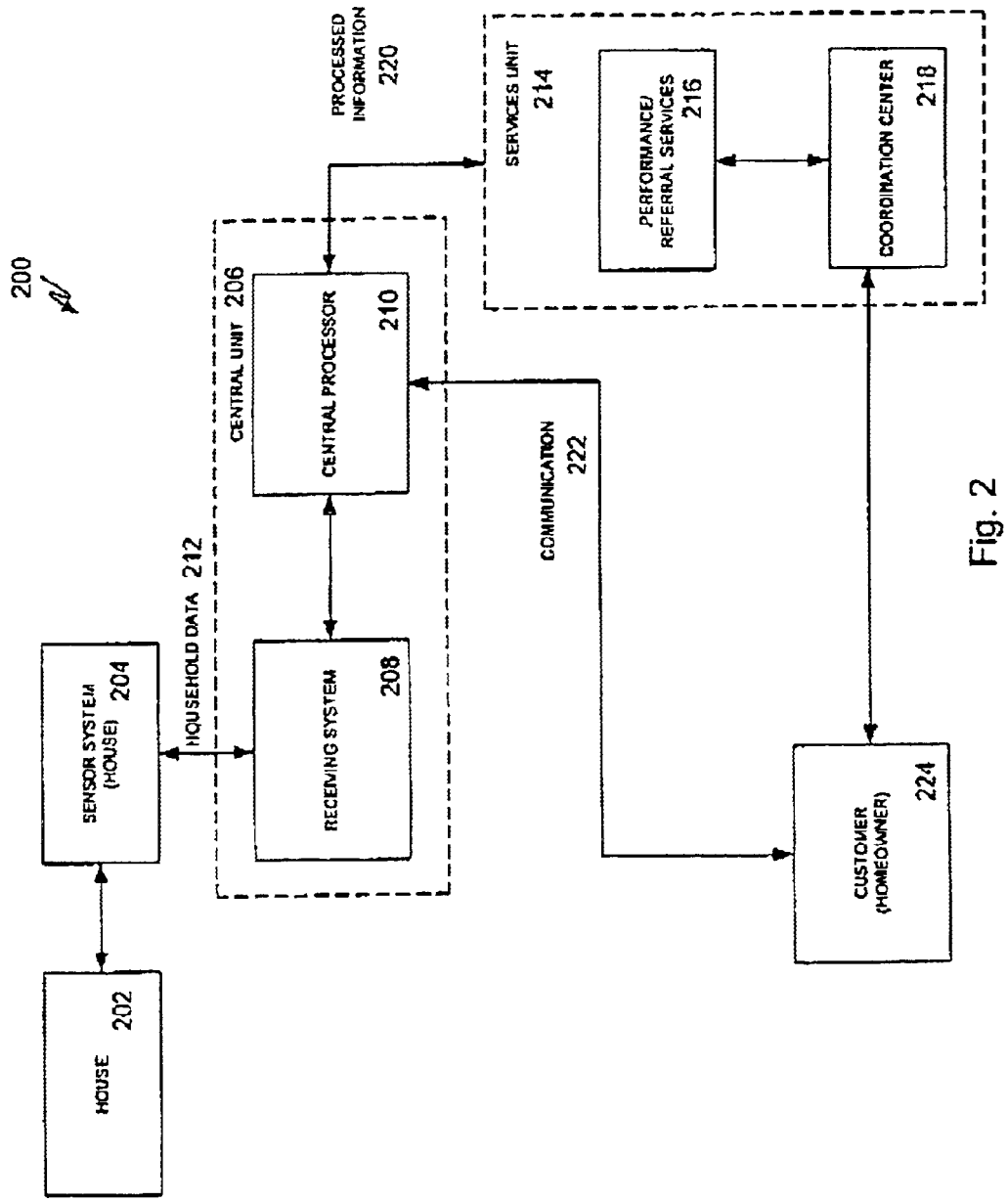
FIG. 2 depicts a block diagram illustrating an example repair and maintenance service system embodying the principles of the invention.

FIG. 2 illustrates an exemplary block diagram 200 depicting a system for the collection and dissemination of household information. The system includes several components, each of which will be discussed in detail. The system is typically operated by a repair and maintenance service provider. For purposes of the discussion of the system, it is presumed that an agreement has been reached between the service provider and the homeowner or customer and an appropriate account has been established for the customer. Also, the terms "homeowner," "customer," "user," and "client" are used interchangeably wherein.

The first component of the system relates to monitoring and collecting data from a customer's house 202. A sensor system 204 is used to detect or collect household data in the house 202. The detected data is conveyed to a central unit 206 which processes the data.

The concepts of "household data" or "household information" are interchangeably used to designate any data that can be detected in a house. There are many categories of information that can be detected in a house. For example, some categories are appliance data, environmental data, and structural data.

Appliance data is related to the operation of appliances and other equipment inside or outside of the house. For example, appliance data includes any abnormal vibrations or leaks, and information relating to the electrical demand of the appliance. The data may be detected or monitored on a continuous or intermittent basis, depending on the frequency of operation of the appliance. Sometimes there may be audible or visual evidence of a problem with an appliance. However, homeowners do not have the time to inspect every appliance for such evidence each time they use the appliance.

Environmental data relates to the environmental conditions of the house. For example, environmental data includes the detection and location of water or moisture in a particular room and the average temperature of a room over a period of time. This data is useful to a homeowner because the data is indicative of a leak or a need to adjust the temperature of a room. Another example of environmental data is the indoor air quality, which is a function of amount of radon, carbon monoxide, mold, pollutants, and other allergens in the indoor air. Many homeowners become accustomed to the environmental conditions in their house and are not cognizant that changes should and need to be made.

Structural data generally encompasses data relating to the structural components of the house (as used herein, structural components includes functional components of the house). Structural components of a house include the roof, pipes, ductwork, windows, doors, walls, foundation, etc. Examples of detected structural data include leaks or cracks in any structural components and the corrosion of any building materials.

The household data is collected by a sensor system 204 that includes sensors that are positioned inside and outside the house 202. Sensors may be coupled to structural components or appliances, laid loosely in selected locations, or incorporated into the building materials and structure of the house. The quantity and location of the sensors is dictated by the amount and types of information to be sensed. For example, sensors for detecting water leaks are located in the basement of a house. Examples of sensors in the building materials include leak detectors in the roof of the house and stress or strain sensors in the walls or foundation to detect any shifting of the house.

The sensors of system 204 incorporate one or more technologies to collect data The particular technology used is determined by the type of data to be detected and the location of the sensor. Some technologies that may be used include electrical, acoustic, physical, chemical, and thermal technologies. Some examples of various sensors include infrared sensors, fiber optic sensors, lasers, vapor sensors, strain and pressure sensors, metal corrosion sensors, etc. Alternatively, the sensor system may include the visual and other sensible detections made by an experienced human inspector, these sensible data being input into a database.

Various monitors and sensors may be used in the sensor system. An example of a monitor is disclosed in U.S. Pat. No. 4,858,141 to Hart et al., the disclosure of which is expressly incorporated by reference herein. The sensors generate an output that is conveyed to the central unit 206. The output is in the form of a specific data point or reading that is continuously or periodically updated. For example, a sensor monitoring the level of moisture in a room may take a sample of the air in the room every few minutes and calculate the amount of moisture in the sample. The output from the sensor will be a numeric value representative of the amount of moisture present.

Alternatively, the output may be binary in form. For example, a sensor monitoring the presence of water in a room generates an output signal upon the detection of water. The sensor has on and off "positions" and when it is in its on position, a signal is generated.

The particular sensor and technology used to detect household data is implementation dependant. In the present invention, the system will operate regardless of the type of data and how it is sensed as long as the output from the sensors is representative of some household data.

Processing Collected Data

In the present invention, the detected household data 212 is transmitted from the sensor system 204 in the house 202 to a central unit 206 as shown in FIG. 2. The central unit 206 includes a receiving system 208 and a¢ral processor 210.

The receiving system 208 receives the household data 212 and conveys it to the central processor 210. The central processor 210 analyzes and converts the data. The data is stored in an internal database (not shown) that is used to generate a historical collection of data for future use.

The household data 212 is transmitted from the sensor system 204 to the central unit 206 using a receiver and a transmitter. The sensor system 204 includes a transmitter that conveys information to the central unit 206. The information is generally in the form of an electrical signal that is representative of the detected data. The types of transmissions include wired or cabled communications, IR signals, RF signals, or other wireless communications.

The receiving system 208 of the central unit 206 includes a receiver that corresponds to the transmitter. The receiver receives the transmitted signal and converts it into an informational form that can be processed by the central processor 210.

The frequency of the transmissions of the household data 212 depends on the types of data being sensed and the types of sensors being used. Typically, detected environmental and structural data is transmitted continuously. Data relating to the operation of appliances may be transmitted continuously during the operation of the particular appliance. Alternatively, appliance data may be transmitted intermittently during appliance operation or even while the appliance is not operating.

The household information converted by the receiving system 208 is transmitted to the central processor 210. The information is stored in electronic files in an internal database accessible by the central processor 210. The central processor 210 sorts the information before it processes and analyzes the information. Sorting the information facilitates the analysis process.

Initially, the information is sorted based on the customer's house or account. The information is subsequently sorted through a hierarchy of criteria based on the particular information being sensed. The sorting criteria may include categories, elements, and types of information. For example, an information category may be environmental, an element may be a particular room or structural element, and the type may be the presence of water.

The central processor 210 analyzes the sorted household information. The household information is analyzed to determine if there is any indication of a potential problem. The information is compared with historical data and predetermined standards that correspond to the particular type of information. Any differences in the data are reviewed and analyzed.

The central processor 210 compares the household information to historical data stored in a database. The historical data is similar to the type of household information that is being analyzed. For example, the manufacturer and model of an appliance is the same. In one embodiment, the historical data is previously collected data for a particular appliance or household element in that customer's house. Alternatively, the historical data may encompass information collected from other houses and stored by the central unit 206 or la information provided by manufacturers in the industry.

The central processor 210 also compares the household information to predetermined standards. The standards are levels of acceptable or unacceptable data readings set by manufacturers or other personnel in the industry. The standard levels may be a continuous range, such as a reading between one and five is acceptable and a reading between six and ten is unacceptable.

Alternatively, the standards may be a binary set of values. For example, a reading of whether water is present is a yes or no indication. In some circumstances, a yes reading is unacceptable and a no reading is acceptable. Another example is whether an appliance has been in operation for an extended period of time.

Any differences between the current household information and the historical data and standards are identified by the central processor 210. The central processor 210 utilizes a software program to compare the data and determine the differences. The central processor 210 is a personal computer, computer program, a microchip, an integrated circuit, or other known operational device. The central processor 210 operates in a known manner as appreciated by the skilled artisan.

In the present invention, the central processor 210 evaluates whether the difference is large enough to justify special notification of the homeowner. A difference is large enough when the percentage change reaches a particular preset level. A significant difference is representative of a problem that needs repair. Notification of the homeowner is discussed in detail below.

The central processor 210 also converts the raw detected data into a status indication that the customer can understand, such as "normal," "high," or "warning."

The detected household information is stored in a database accessible by the central processor 210 to create a historical collection of information related to the house. The historical information is used in several ways. First, the information provides a library to help identify abnormal or extreme readings. Second, homeowners have access to the information on particular appliances which helps them make decisions on future purchases. Third, the historical operational data of an appliance or structural element may be sold to and/or exchanged with the applicable manufacturer. The manufacturer can review the historical information to evaluate the appliance operational life and identify frequently occurring problems with the appliance. The manufacturers can develop an industry knowledge base with the detected information.

Alternatively, the central processor 210 may operation in a distributed processing arrangement. The central processor 210 may include multiple processing components. For example, the data from the sensor system 204 may be processed locally at a first processor and then forwarded to a second processor. This arrangement is applicable when the output or data from a sensor falls outside an acceptable range, in which case the homeowner is immediately alerted to the problem. This preliminary analysis of the data occurs prior to the transmission of the data to the second processor and the storing of the data in a database.

Dissemination of Information from Central Unit

In the present invention, the repair and maintenance system generates several types of information. The information is conveyed to the customer, internally to a services unit component of the system, and potentially to third parties. The information includes customer specific information relating to the customer's house and generic information relating to a manufacturer or industry.

The central unit 206 transmits information to a customer in communication 222 as shown in FIG. 2. Several categories of information are transmitted in communication 222. One category is detected household information. Another category is messages notifying the customer of readings that are indicative of a potential problem. Other information includes manufacturer or industry related knowledge.

The first category of information in communication 222 is information relating to the data detected for the house. The sensor system 204 outputs data to the central unit 206 and the central processor 210 analyzes the data as discussed above. The household information may be transmitted in two formats. The raw detected data may be transmitted to the customer. Alternatively, the conversions of the raw data by the central processor 210 into standard levels or status indications may be transmitted.

Customers desire different levels and amounts of information. The amount of information that a customer wants access to is related to the amount of time that the customer is willing to invest reviewing and processing the information. Customers that are interested in closely monitoring the household information themselves typically prefer to have access to all of the information that is being monitored. These customers would opt for receiving household information including the raw data format.

Other customers that do not have or do not wish to spend time reviewing the household information would rather receive status indications representative of the readings. Some customers may not wish to receive any household data at all.

Another category of information output to the homeowner is messages notifying the homeowner of a reading that may indicate a problem requiring repair or maintenance. Contrary to the household data discussed above, customers usually want to receive these notification messages. The message identifies the particular information being monitored, the reading that may warrant repair or maintenance, and what such a reading may indicate. For example, readings that are indicative of potential problems and warrant repair or maintenance include the presence of water, cracks in a foundation, corrosion or leaks in piping, etc. The customer can contact the services unit 214 of the system to discuss the information in the notice.

The frequency of communications 222 between the central unit 206 and the customer 224 varies. The frequency is determined by the customer preference and the medium in which the communication 222 occurs.

For example, customers 224 interested in monitoring the data themselves may desire continuous streams of all of the information being detected by the sensor system 204. Other customers 224 prefer periodic updates for some of the detected information or only notifications of potential problems. The updates occur at predetermined time intervals, such as one minute, five minutes, etc.

In the present invention, relevant household information is conveyed to the customer 224 directly through communication 222 or indirectly through the services unit 214. The communication 222 between the central unit 206 and the customer 224 can be accomplished through several different media. For example, communication 222 may occur via a web interface, an Email message, a telephone call, an interactive voice response system (IVR), or an interactive television (I-VR) connection.

Figure 3:
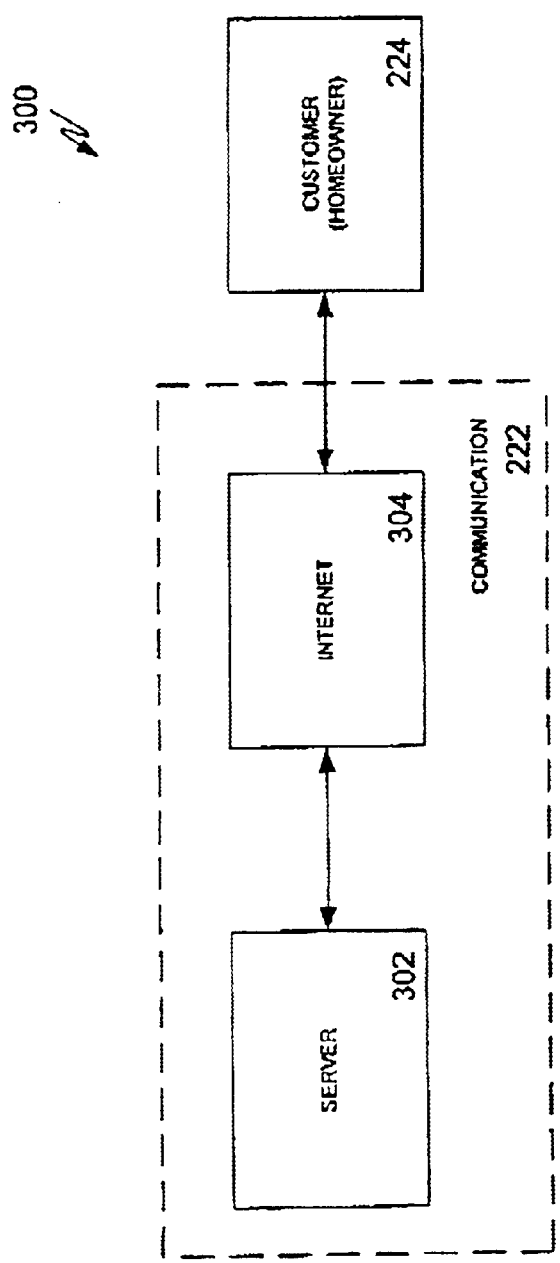
FIG. 3 depicts a block diagram illustrating a process by which household information is communicated to a customer.

A web interface utilizes a server 302 and the Internet 304 as shown in the block diagram depicted in FIG. 3. The repair and maintenance service provider monitors and controls a web site accessible via the Internet 304. The customer 224 can access the web site and information related to the customer's house 202 at any time.

Figure 4:
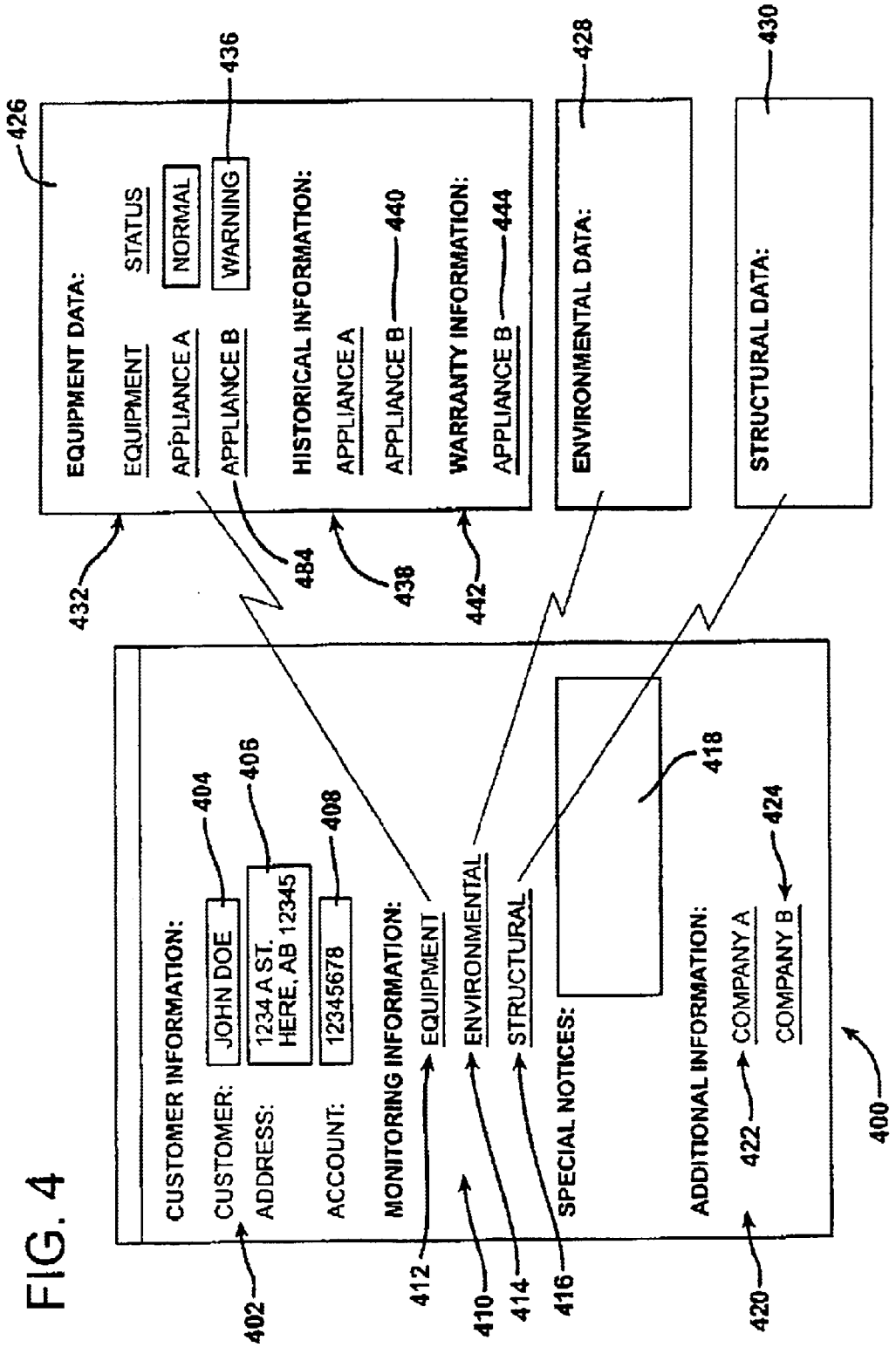
FIG. 4 is a schematic view that illustrates an embodiment of a web interface that provides household information to a customer.

A schematic example of a part of a service provider's web site is shown in FIG. 4. Customers initially enter identifying information, such as an account number and a password, to gain access to the web site. The web site 400 provides customers access to customer specific information and generic information.

The web site 400 includes customer specific "pages" that are accessible only by the particular customer. A customer specific page 402 includes basic information identifying the customer. For example, the illustrated page 402 includes fields for displaying the customer's name 404, address 406, and account number 408. The page 402 is personalized for the particular customer 224.

A monitoring information section 410 is provided on page 402. In one embodiment, section 410 includes hyperlinks 412, 414, and 416 to separate pages for different categories of household data. In FIG. 4, the separate pages are shown as corresponding to equipment data 426, environmental data 428, and structural data 430, respectively. It is to be appreciated that any number of pages and categories of information may be used in the system. Alternatively, the various household data may be presented in the monitoring information section 410 of page 402.

Page 402 also includes a notification section 418. Any messages relating to the household data or to the repair and maintenance service provider generally are displayed in section 418. The customer 224 can contact the service provider regarding any messages on the page 402.

In the illustrated embodiment of the page 402, a generic information section 420 is also provided. Generic information section 420 is tailored to the particular customer. Hyperlinks 422, 424 in section 420 facilitate access by the customer 224 of any manufacturer or industry information. Hyperlinks 422, 424 are shown as links to the web sites of 25 manufacturers of some of the appliances being monitored in the customer's house 202.

For example, a customer may request the monitoring of a washer and dryer manufactured by Company A and windows manufactured by Company B. Hyperlinks to the web sites for Company A and Company B are provided on page 402. The hyperlinks to the manufacturers'web sites makes it easier for the customer to get more information on a particular piece of equipment.

Hyperlinks to the web sites of realtors and the contractors, installers, and/or repairers of the equipment that is being monitored and to the web sites or reference materials of industry or local organizations may also be provided.

The data specific pages 426, 428, and 430 are now described. In the illustrated embodiment, pages 426, 428, and 430 provide information relating to the equipment, environmental, and structural data being sensed in the customer's house 202. The types and amounts of information and the frequency at which the information is updated on the web site depend upon the customer's preferences and the types of information. Since each of the pages 426, 428, and 430 is substantially similar in layout, only equipment page 426 will be discussed in detail.

Equipment page 426 contains a current section 432 with information relating to the currently monitored equipment and a historical section 438 which includes stored information for the equipment. The equipment page 426 can also contain a warranty section 442 which includes warranty information for the equipment.

The current section 432 contains two sets of fields 434, 436. Fields 434 identify the equipment being monitored, such as Appliance A and Appliance B. Alternatively, the fields 434 may represent only a subset of the equipment being monitored.

Fields 436 contain numeric or status information corresponding to the equipment in fields 434. The information in fields 436 depends on the level of information to be provided. As discussed above, customers desire different levels and frequency of information. The levels of information include raw data, raw data converted to a status indication, etc. The displayed information is continuously or intermittently updated.

The historical section 438 contains historical data for the customer's house and equipment. Data for each piece of equipment or household element is stored in a database. The data is usually in the form of a series of points or snap shots over time. Hyperlinks 440 are provided for each appliance or household element. The customer 224 can access the relevant historical data for a particular appliance, etc. by clicking on the appropriate hyperlink.

The warranty section 442 contains warranty information for the customer's equipment. Information relating to the period of coverage and the problems that are covered by the warranty can be included for each piece of equipment or household element. Hyperlinks 444 are provided for each appliance or household element. The customer 224 can access the relevant warranty information for a particular appliance, etc. by clicking on the appropriate hyperlink.

In the illustrated embodiment, the monitored household information is presented on a series of pages. Alternatively, a customer's information may be provided on a single page. Another alternative embodiment contains separate pages for each piece of equipment, structural element, or environmental condition that is monitored.

The information in communication 222 may be disseminated to the customer 224 by ways other than a web interface. The format of the disseminated information depends on the medium. The format and availability of the information to a customer that is using an I-TV connection is similar to that of the information conveyed via a web interface. If the customer wants only periodic updates or notifications of potential problems, the service provider can call or Email the customer with the relevant information. Alternatively, the customer may be notified of a potential problem by an LED or other physical change in the house 202.

As shown in FIG. 2, the system includes a services unit 214. The service unit 214 coordinates repair and maintenance services based on the household information processed by the central unit 206. The central unit 206 transmits processed information 220 to the service unit 214 via any wired or wireless communication link between the two units.

The processed information 220 includes any conversion of the raw detected data and the difference between the detected data and historical data and standards. Alternatively, the information 220 may include the raw detected data as well.

The central unit 206 can also convey information to third parties, including appliance manufacturers, equipment repair personnel, and other industry personnel. The transmitted information includes historical data that has been collected by the central unit 206. The manufacturers develop databases with the recorded information and use them for future research and development. The transmissions are made in any known manner as appreciated by the skilled artisan.

Coordination of Services

The services unit 214 of the repair and maintenance system has a performance/referral services component 216 and a coordination center 218. The services unit 214 performs several functions. The functions may be categorized into two groups: advisory and work-related.

The advisory category encompasses the functions of reviewing and analyzing data from the central unit, sending notifications to customers, discussing the household information with customers, and reviewing and monitoring warranties. The work-related functions are the recommending of repair and maintenance services, the performing of the services, and the monitoring and coordinating of the services.

Many customers that receive household information from the central unit 206 do not know how to use or interpret the information. The information alone does not indicate what repairs need to be or should be done.

The services unit 214 reviews and analyzes the processed information 220 from the central unit 206 to understand the current status of the house. If a notification of a potential problem should be sent to the customer and has not been sent yet, the services unit 214 sends the notification in a normal manner.

The services unit 214 has several opportunities for customers to discuss the household data and whether any repairs or maintenance is recommended. Personnel with expertise in the home improvement industry are available to discuss these issues with customers.

Customers may communicate with the personnel by telephone, computer, or during a personal visit. The customers and personnel may discuss the issues via a telephone conference, Email messages, a video telephone conference (VTC), etc.

The services unit personnel provide guidance and advice on the household information. The personnel interpret the household data for the customer, provide a recommendation for a scope of repair, if applicable, and discuss alternatives.

After the customer decides which repair or maintenance needs to be done, the services unit 214 provides a list of recommended service personnel or repair organizations that perform the particular type of repair and maintenance work. The service personnel may or may not be associated with the services unit 214.

Once the service personnel is selected, the call center 218 coordinates the contact and scheduling of the work, regardless of whether the personnel is associated with the services unit 214. The services unit 214 simplifies the repair and maintenance process by eliminating the need for the customer to schedule and monitor repair services.

Another function of the services unit 214 is to review and monitor warranties. Since everything a customer purchases potentially has a warranty, many customers are overwhelmed attempting to track the warranties. The service unit 214 can also offer home warranties to homeowners.

The protection afforded by a warranty is limited in scope by time and the types of problems. The services unit 214 includes a customer specific database that identifies the warranties for the particular household elements that are being monitored. Thus, when a problem with an appliance or other household element arises, the services unit 214 can determine easily whether the warranty covers the problem.

The services unit also performs inspections for homeowners that are not subscribers to the monitoring service. The inspections are part of an advising and preventative maintenance function of the services unit. During inspections, the services unit identifies other repairs and makes recommendations on the appropriate actions to be taken. The inspections may be made once or on a recurring basis.

The system also performs a reminder function. The homeowner advises the services unit of the installation dates of household components and when any repair or maintenance was performed on the components. The system generates reminders for particular types of repair and maintenance projects and sends the reminders to homeowners. The reminders are generated in addition to the detected household information.

The reminders are generally time-based or seasonal-based reminders. An example of a time-based reminder is a reminder that it has been five years since you installed pump A and it is now time for pump A to be replaced. An example of a seasonal-based reminder is that it is now fall and the gutters should be replaced. The reminders are forwarded to homeowners in the same manner as household information as discussed above. The seasonal repair and maintenance projects may be scheduled by the services unit, thereby eliminating the need for the homeowner to remember every seasonal maintenance issue.

In addition to the household data monitoring functions, the services unit may also perform vacation and burglar monitoring functions.

Operation of System

Figure 5:
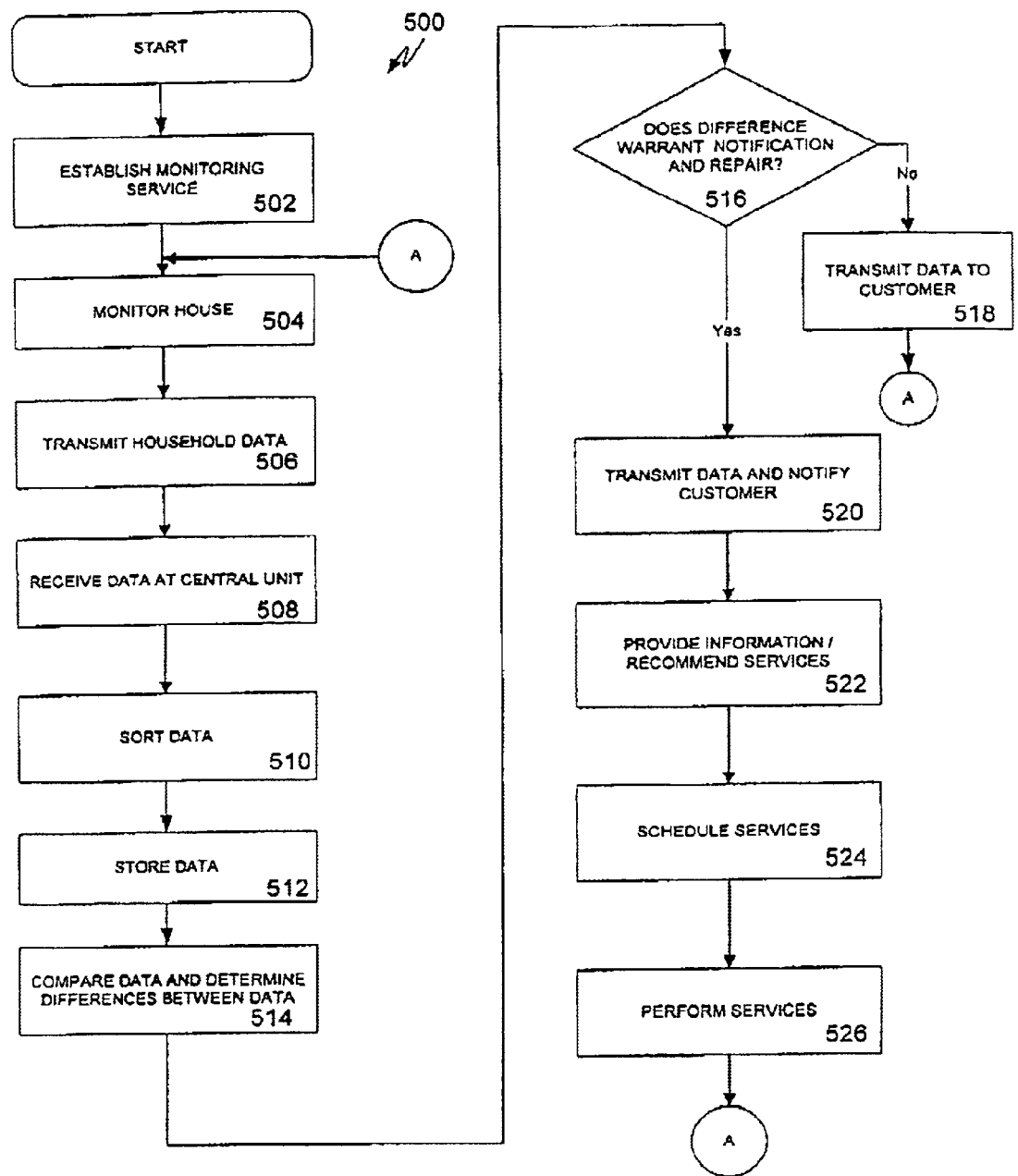
FIG. 5 depicts a flow diagram illustrating an example repair and maintenance service process.

A repair and maintenance process embodying the principles of the invention in the flow block diagram 500 depicted in FIG. 5. The flow diagram is an example of the process illustrating the identification of a household problem and the coordination of repair and maintenance services to remedy the problem.

Specifically, in step 502, a homeowner becomes a customer of the repair and maintenance service provider upon entering a contract to initiate the monitoring service. Different levels of service are available to the customer. The customer can select between a single home inspection or the continuous monitoring of the house. The customer is assigned an account. The method continues with step 504.

In step 504, a sensor system 204 is installed in the customer's house 202. The sensors of the system 204 are positioned in each of the locations in the house 202 that are to be monitored. The method continues with step 506.

In step 506, the sensor system 204 includes a transmitter that transmits monitored household data back to the central unit 206. Prior to the transmission, the raw data is converted into electronic signals by the transmitter. The method continues with step 508.

In step 508, the transmitted data is received by a receiver of receiving system 208 of the central unit 206. The receiver converts the transmitted electrical signals to electronic values representative of the detected data. The method continues with step 510.

In step 510, the central processor 210 sorts the detected data. The data is sorted based on the household element and the type of information being sensed. Sorting is necessary to enable the processor 210 to analyze the data. The method continues with step 512.

In step 512, the detected data is stored in a database. The data is archived to generate a historical base of information for a particular customer, appliance, household element, etc. The method continues with step 514.

In step 514, the central processor 210 compares the detected data with corresponding historical data and predetermined industry or manufacturer standards. The difference between the data values is calculated. The difference is converted into a status indicator that is used to help a homeowner determine whether a problem potentially exists. The method continues with step 516.

In step 516, the central processor 210 determines whether the difference in the data is significant enough to require repair and maintenance.

If the difference in step 516 is not significant enough, the method continues with step 518 and the central unit 206 transmits information via communication 222 to the customer 224. The information includes raw detected data and status indications representing the detected data. The method returns to step 504 and continues.

If the difference in step 516 is significant enough, the method continues with step 520 and the central unit 206 transmits information via communication 222 to the customer 224. The information in this communication contains raw detected data, a status indication representing the detected data, and a message to the customer notifying the customer of a potential problem. The method continues with step 522:

In step 522, the services unit 214 provides additional information and the opportunity to discuss the data to the customer. The information includes an explanation of the transmitted household data, an indication of potential problems, a recommendation for the repair and maintenance of the potential problems, and a list of repair service personnel. The a method continues with step 524.

In step 524, after the customer 224 has elected to proceed with a repair project in the house 202 and has selected service personnel, the service unit 214 schedules and coordinates the repair project. The method then continues with step 526.

In step 526, the repair and maintenance work is performed. Upon the completion of the repair project, the method returns to step 504 and continues.

It is to be appreciated by the skilled artisan that the description above is not limited to just homeowners and houses, but is applicable to any building and the landlord or occupants of the building. The building may be used for residential or non-residential purposes.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for monitoring a house comprising:

a sensor component that receives data from at least one sensor located in the house, said at least one sensor monitoring at least one of an appliance, structural element, and environmental condition;

an analysis component that analysis said data and converts said data into status information, said analysis component storing said data and status information to develop historical information, said historical information relating to said at least one of an appliance, structural element, and environmental condition; and a customer interface component that enables a customer to access said generated data, previous historical information, and said status information via an online customer user interface, said customer interface component further enabling a customer to access warranty information corresponding to said at least one of an appliance, structural element, and environmental condition.

2. The system of claim 1, wherein said data from at least one sensor includes at least one of environmental data, equipment data, and structural data.

3. The system of claim 1, wherein said customer interface component enables a customer to access information related to potential problems in the house.

4. The system of claim 1, further comprising:

a service component that advises a customer on said generated data.

5. The system of claim 3, wherein said service component recommends actions to the customer based on said at least one of said generated data and said status information.

6. A method of providing information to a customer, the method comprising the step of:

receiving monitored data from a sensor located in a customer home, the sensor monitoring at least one of an appliance, a structural element and an environmental condition;

generating status information representative of the monitored data;

storing the monitored data and status information to develop historical information;

transmitting the monitored data and the status information to a customer via an online customer user interface, wherein the customer has access to the historical information; and providing a customer with access to warranty information corresponding to said at least one of an appliance, a structural element, and an environmental condition.

7. The method of claim 6, wherein said step of generating status information includes analyzing the monitored data relative to standard and previous historical information.

8. A method of monitored a house, the method comprising the steps of:

receiving monitored data for a plurality of items in a customer home, said monitoring data being generated by one or more sensors located in the customer home;

determining whether the monitored data for any of the items indicates a potential problem;

notifying a customer of the status of the potential problem; and transmitting the monitored data, including warranty information, and the status information for each of the items to a customer via an online customer user interface.

9. The method of claim 8, further comprising the step of:

advising a customer of recommended services corresponding to the potential problem.

* * * * *